(12) United States Patent
Honda

(10) Patent No.: US 7,003,382 B2
(45) Date of Patent: Feb. 21, 2006

(54) ELECTRONIC CONTROL UNIT FOR A VEHICLE

(75) Inventor: Takayoshi Honda, Kariya (JP)

(73) Assignee: Denso Corporation, Kariya (JP)

( * ) Notice: Subject to any disclaimer, the term of this patent is extended or adjusted under 35 U.S.C. 154(b) by 108 days.

(21) Appl. No.: 10/816,936

(22) Filed: Apr. 5, 2004

(65) Prior Publication Data

US 2004/0204800 A1 Oct. 14, 2004

(30) Foreign Application Priority Data

Apr. 11, 2003 (JP) ............................ 2003-108116

(51) Int. Cl.
*G06F 12/16* (2006.01)
(52) U.S. Cl. ...................... 701/1; 701/115; 701/114
(58) Field of Classification Search ..................... None
See application file for complete search history.

(56) References Cited

U.S. PATENT DOCUMENTS 5,801,621 A * 9/1998 Issa et al. .................... 340/439
6,243,630 B1 * 6/2001 Oohara et al. ................. 701/35
6,308,121 B1 * 10/2001 Ulm ............................. 701/35

FOREIGN PATENT DOCUMENTS

| JP | 62-191952 | 8/1987 |
|----|-----------|--------|
| JP | 8-36532 | 2/1996 |
| JP | 9-244707 | 9/1997 |
| JP | 9-330104 | 12/1997 |
| JP | 11-353064 | 12/1999 |
| JP | 2002-30988 | 1/2002 |

* cited by examiner

*Primary Examiner*—Michael J. Zanelli
(74) *Attorney, Agent, or Firm*—Nixon & Vanderhye P.C.

(57) ABSTRACT

In an electronic control unit for a vehicle, control data is stored in a volatile memory until a predetermined time passes after an ignition switch is turned off. This makes it possible to greatly reduce the frequency at which data is written into a nonvolatile memory. When the predetermined time has passed after the ignition switch is turned off, the control data stored in the volatile memory is written into the nonvolatile memory. Thereafter, the power supply from a power supply circuit to the volatile memory is stopped. Consequently, it is possible to store the control data reliably in either the volatile memory or the nonvolatile memory. It is also possible to reduce the dark current in the volatile memory.

11 Claims, 4 Drawing Sheets

ELECTRONIC CONTROL UNIT FOR A VEHICLE

CROSS REFERENCE TO RELATED APPLICATION

This application is based on and incorporates herein by reference Japanese Patent Application No. 2003-108116 filed on Apr. 11, 2003.

FIELD OF THE INVENTION

The present invention relates to an electronic control unit for a vehicle. In particular, the invention relates to an electronic control unit that holds control data, with which an engine and/or other equipment of a vehicle is controlled, while the predetermined switch signal input from an ignition switch, a key switch or another external device is held OFF.

Japanese Unexamined Patent Publication Nos. 2002-30988 and H9-244707 each disclose a system that holds control data, with which an engine and/or other equipment of a vehicle is controlled, while an ignition switch is held OFF.

The system of the publication No. 2002-30988 has a RAM, which is a volatile memory backed up by a power supply. Control data, with which the engine and/or other equipment is controlled, is written periodically into the RAM. When the ignition switch is turned off, the RAM holds the control data. Thereafter, when the ignition switch is turned on again, the control data is read from the RAM. The engine and/or other equipment is controlled with the read data.

The system of the publication No. H9-244707 has a SRAM (static RAM) as a volatile memory and a flash PROM as a nonvolatile memory. The SRAM stores control data such as learning values for engine control. In the meantime, the control data is written at regular intervals from the SRAM into the flash PROM. This makes it possible to reduce the frequency at which the control data is written into the nonvolatile memory, and to enable continuous storage of the data.

In the system of the publication No. 2002-30988, the RAM needs to be always supplied with power. Therefore, even while the ignition switch is held OFF, dark currents flow through the power supply circuit and the RAM, consuming power of the vehicle battery. The dark currents result from the current consumed in the RAM and the voltage conversion loss current in the power supply circuit. The sum of the consumed current and the loss current may be about 0.6 mA.

Therefore, as disclosed in the publication No. H9-244707, it is conceivably possible to reduce the dark currents by storing control data in the flash PROM, not the SRAM, and stopping the power supply to the SRAM when the ignition switch is turned off. It is possible to write data etc. into a flash PROM or another nonvolatile memory only a limited number of times, which may be 100,000 times. It therefore becomes impossible to write date etc. into the nonvolatile memory at very short intervals because the number of writing data will readily reach such a limit value. For example, the publication No. H9-244707 discloses that control data is written into the nonvolatile memory at intervals of longer time intervals, for instance one hour.

Even if the data is written at intervals of one hour, however, it will be written an increased number of times in the nonvolatile memory if the vehicle is driven continuously for a long time everyday. If the vehicle is mainly used only for short distances and is not driven continuously for more than one hour, no control data may be written at all into the flash PROM.

As disclosed in the publication No. H9-244707, the control data includes correction factor learning values for making the condition of the engine approximate the stoichiometric air/fuel ratio, sensor correction learning values for correcting the aging of sensors, or speed change timing learning values in consideration of the clutch wear in the automatic transmission. If, without being written into the flash PROM, the learning values vanish from the SRAM when the ignition switch is turned off or when the battery is replaced, the engine controllability and/or the automatic transmission controllability may worsen.

The publication No. H9-244707 discloses that control data is written from the volatile memory into the nonvolatile memory merely at regular intervals. This may not be sufficiently effective in terms of the number of times at which the data is written and/or the reliability with which it is held.

SUMMARY OF THE INVENTION

The object of the present invention is to provide an electronic control unit for a vehicle that has a volatile memory in which a dark current is reduced and a nonvolatile memory into which control data is written a reduced number of times, and that holds control data reliably while the ignition switch is held OFF.

In the present invention, control data is stored in a volatile memory until a predetermined time passes after a switch signal is rendered off. This makes it possible to maintain good writing and reading accessibility, and to greatly reduce the frequency at which data is written into the nonvolatile memory. When the predetermined time has passed after the switch signal is rendered off, the control data stored in the volatile memory is written into the nonvolatile memory. Thereafter, the power supply to the volatile memory is stopped. Accordingly, every time the power supply to the volatile memory is stopped, the control data is written into the nonvolatile memory. The period from when the switch signal is rendered off to when the off signal is rendered on may be the predetermined time or longer. In this case, the power supply to the volatile memory is stopped, so that the dark current in this memory can be reduced.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT

Figure 1:
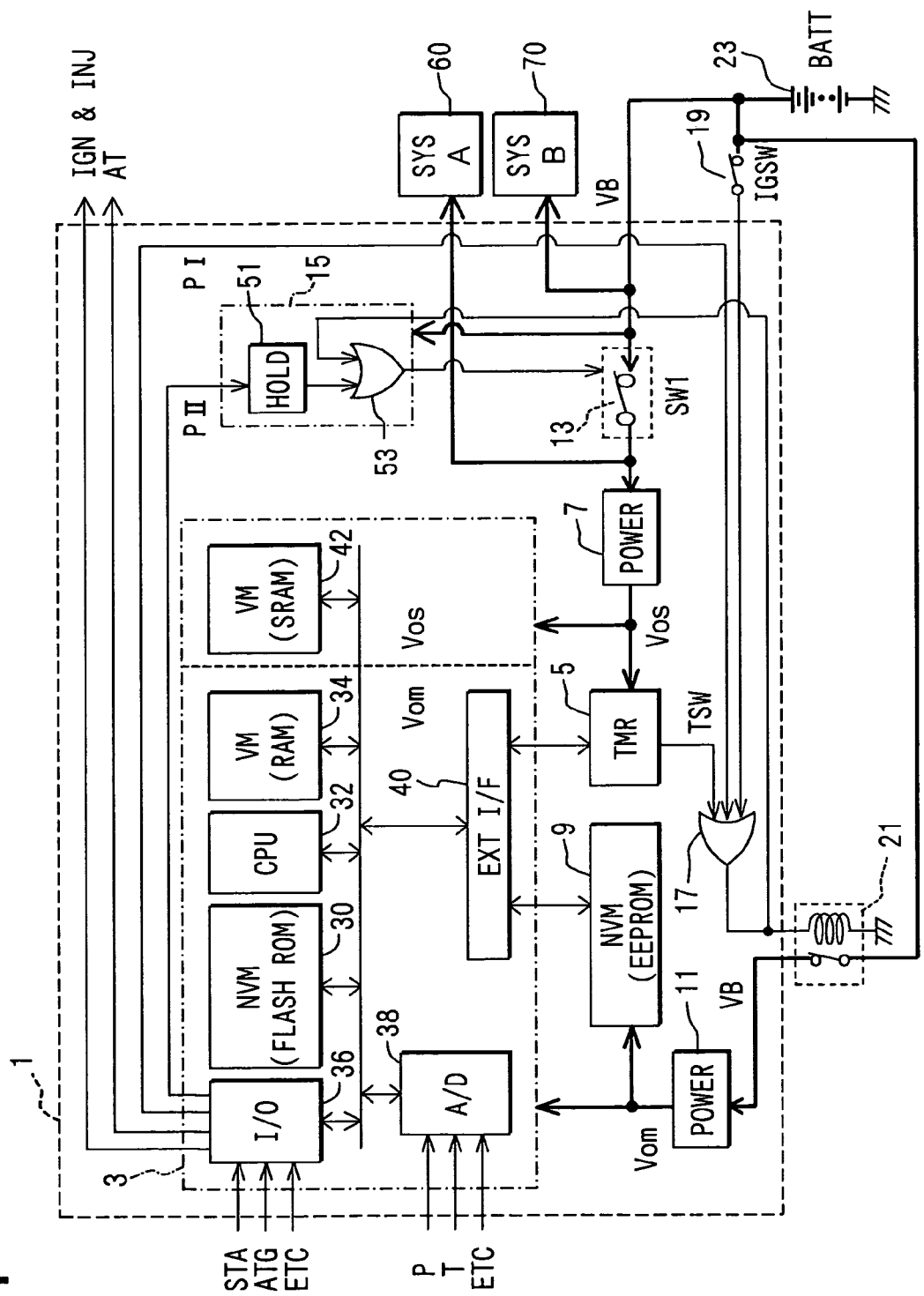
FIG. 1 is a block diagram of an electronic control unit embodying the present invention.

Referring to FIG. 1, an electronic control unit (ECU) 1 is applied as a controller for an engine and automatic transmission of a vehicle. The control unit 1 might also be applied as a controller for the brake, suspension, airbag and/or other equipment of the vehicle.

The control unit 1 includes a microcomputer 3, a timer 5, a power supply circuit 7, a nonvolatile memory (NVM) 9 and another power supply circuit 11. The microcomputer 3 executes various routines mainly for controlling the engine and the automatic transmission. The timer (TMR) 5 counts time while the microcomputer 3 is not operating after the ignition switch 19 is turned off. The power supply circuit 7 outputs an operating voltage Vos of 5 volts for operating the timer 5. The nonvolatile memory 9 stores control data such as learning values with which the engine and the automatic transmission can be controlled. The power supply circuit 11 outputs an operating voltage Vom of 5 volts to the microcomputer 3 and the nonvolatile memory 9.

The power supply circuit 7 is supplied with battery voltage VB from a vehicle battery 23 through a switch 13. When the power supply circuit 7 is supplied with battery voltage VB, it generates and outputs the operating voltage Vos. A switch driving circuit 15 outputs a driving signal for turning on or off the switch 13. When the level of the driving signal is high or low, the switch 13 is turned on or off, respectively.

The switch driving circuit 15 is supplied with a signal from a main relay 21 and designation signal PII from the microcomputer 3. The switch driving circuit 15 includes a holding circuit 51 and a driving circuit 53, which functions as an OR circuit. When the microcomputer 3 outputs the high-level designation signal PII, which designates the switch 13 to be turned on, the holding circuit 51 holds the high-level signal. The holding circuit 51 keeps outputting the high-level signal until the microcomputer 3 outputs a low-level designation signal PII for resetting the high-level signal holding.

The signals from the holding circuit 51 and main relay 21 are supplied through the driving circuit 53 to the switch 13. If the level of any of these signals is high, the driving circuit 53 outputs a high-level driving signal, turning on the switch 13, so that the power supply circuit 7 is supplied with battery voltage VB.

The switch driving circuit 15 is supplied with the signal from the main relay 21 because, while battery voltage VB is supplied through the main relay 21 to the first supply circuit 11, it needs to be supplied to the second supply circuit 7 as well. Specifically, while the first supply circuit 11 is outputting the operating voltage Vom, the second supply circuit 7 needs to output the operating voltage Vos in order to prevent power supply mismatching in the microcomputer 3. The switch driving circuit 15 might be supplied with operating voltage Vom from the first supply circuit 11 in place of the signal from the main relay 21.

The coil of the main relay 21 is connected with a driving circuit 17, which functions as an OR circuit. The driving circuit 17 is supplied with signal IGSW through the ignition switch 19 of the vehicle, a power supply starting signal TSW from the timer 5 and a power supply holding signal PI from the microcomputer 3. Signal IGSW indicates whether the ignition switch 19 is held ON or OFF. While the ignition switch 19 is held ON, or while the timer 5 is outputting high-level power supply starting signal TSW, or while the microcomputer 3 is outputting the high-level power supply holding signal PI, the coil of the main relay 21 is supplied with current, so that the relay contact is held ON or closed. Consequently, the power supply circuit 11 is supplied with battery voltage VB through the main relay 21.

When the power supply circuit 11 starts to output the operating voltage Vom, the microcomputer 3 starts to operate from its initial state. The microcomputer 3 includes a flash ROM or another nonvolatile memory 30, a CPU 32, a RAM or another volatile memory 34, an I/O port 36, an A/D converter 38, an external I/F 40, and a static RAM or another volatile memory 42. The nonvolatile memory 30 stores an operating program, according to which the CPU 32 executes the control processing for the engine, etc. The volatile memory 34 temporarily stores the results of the operation by the CPU 32, etc. A starter signal STA, an automatic transmission gear signal ATG, ETC. can be input into the I/O port 36. The A/D converter 38 converts the sensor signals necessary for the control processing into digital signals. The sensor signals may represent the suction pressure P, water temperature T, etc. of the engine. The external I/F 40 communicates with the timer 5 and nonvolatile memory 9. The volatile memory 42 stores control data, with which the engine etc. can be controlled.

The control data may include correction factor learning values for making the engine air/fuel ratio approximate to the stoichiometric air/fuel ratio, sensor correction learning values for correcting the output drifts or shifts of sensors of the vehicle due to the sensor aging, and/or speed change timing learning values in consideration of the clutch wear in the automatic transmission. Every time the vehicle is driven, the learning values are updated on the basis of the sensor signals and the conditions of the engine and other controlled equipment. The latest learning values are stored in the volatile memory 42.

The volatile memory 42 needs to hold the learning values even after the power supply circuit 11 stops supplying the microcomputer 3 with operating voltage Vom. Therefore, the microcomputer 3 has a Vom area that can be supplied with the operating voltage Vom from the power supply circuit 11 and a Vos area that can be supplied with the operating voltage Vos from the power supply circuit 7. The volatile memory 42 is provided in the Vos area. When the ignition switch 19 is turned off, the main relay 21 is automatically turned off, so that the power supply circuit 11 stops supplying the operating voltage Vom. Even after the supply of operating voltage Vom is stopped, the operating voltage Vos from the power supply circuit 7 keeps the volatile memory 42 from losing the control data.

If the control data are always held in the volatile memory 42, however, at least some power of the vehicle battery 23 would be consumed for the dark currents in this memory 42 and the power supply circuit 7. In particular, if the vehicle is not used for a long period of time, the vehicle battery 23 might run out. Therefore, this embodiment is provided with the rewritable nonvolatile memory 9, which may be an EEPROM. If a predetermined condition is met, the control data is written from the volatile memory 42 into the nonvolatile memory 9, and the switch 13 is turned off to stop the power supply circuit 7 from supplying the operating voltage Vos. The processing for writing the control data into the nonvolatile memory 9 will be described later in detail. The nonvolatile memory 42 may be an EEPROM, a flash ROM, a galvano magnetic field type memory MRAM, a ferroelectric memory FeRAM, an OUM using a phase change film, or an RRAM based on magnetoresistance efficiency. The nonvolatile memory 9 might alternatively be included in the microcomputer 3.

The timer 5 is used to determine the timing for writing the control data into the nonvolatile memory 42. When the ignition switch 19 is turned off, the microcomputer 3 stops operating and instructs the timer 5 to start counting time of turned-off condition of the ignition switch 19. If the counted time reaches a predetermined reference time, which may be 15 hours, the timer 5 outputs a high-level power supply starting signal TSW.

When the microcomputer 3 starts operating with the operating voltage Vom supplied from the power supply circuit 11, it makes the level of power supply holding signal PI for the driving circuit 17 high, keeping this power supply circuit 11 outputting the operating voltage Vom. If the microcomputer 3 determines that a predetermined operation stopping condition has been met, it makes the level of power supply holding signal PI low, stopping the power supply circuit 11 from supplying the operating voltage Vom, so that the microcomputer 3 stops operating.

The microcomputer 3 may start up when the ignition switch 19 is turned on. In this case, the operation stopping condition is met when the processing necessary after the ignition switch 19 is turned off ends. The microcomputer 3 may also start up when the level of power supply starting signal TSW from the timer 5 becomes high while the ignition switch 19 is OFF. In this case, the operation stopping condition is met when the processing necessary at that time ends. The microcomputer 3 can read the state of the ignition switch 19, but it is not shown how the state can be read.

A system B, which may be a keyless entry system, releases or unlocks a locked door of the vehicle in response to a signal from a remote key. The system B is supplied with power directly from the vehicle battery because it always needs to monitor the signals from the remote key whether the ignition switch 19 is held ON or off. The system A may be the alarm (flashing) light of an antitheft device. If the system A may be temporarily turned off while the vehicle is not used for a long period of time, it is connected through the switch 13 to the vehicle battery 23.

The microcomputer 3 starts its processing, when the operating voltage Vom is supplied from the power supply circuit 11. Step S100 is to make the level of power supply holding signal PI for the driving circuit 17 high, so that the power supply circuit 11 keeps outputting operating voltage Vom, and to make the level of designation signal PII high, so that the holding circuit 51 outputs a high-level signal. Because the level of both signals from the main relay 21 and holding circuit 51 are presently high, the switch 13 is held ON, so that the power supply circuit 7 keeps outputting the operating voltage Vos.

The next step S110 is to determine whether the level of the value of the flag SRAMflg set in the volatile memory 42 is high. The flag value is the basis for determining whether the supply of the operating voltage Vos to the volatile memory 42 has been stopped before the microcomputer 3 starts up this time. The flag value is set at the high level in a later step S130. If it is determined at step S110 that the level of the flag value is high, it indicates that the volatile memory 42 keeps supplied with operating voltage Vos and holds the control data stored in it. If the level of the flag value is low, it indicates the contents of the volatile memory 42 have been lost by failure to supply operating voltage Vos.

For example, the value of the flag SRAMflg might be $5A in stead of being simply high or low in level. In this case, it is likely that the flag value will differ from $5A even if the contents of the volatile memory 42 have been changed by a drop in the operating voltage Vos and/or a noise. By determining whether the flag value is $5A, it is possible to improve the accuracy in determining whether the control data is correctly stored.

If it is determined at step S110 that the level of the value of the flag SRAMflg is low, no control data is stored in the volatile memory 42. In this case, step S110 is followed by step S120 of data transfer, that is, reading the control data from the nonvolatile memory 9 and writing the read data into the volatile memory 42. If it is determined that the level of the flag value is high, the volatile memory 42 stores the control data. In this case, step S110 is followed by step S130, without step S120 executed. As stated above, step S130 is to set the value of the flag SRAMflg at the high level.

The next step S140 is to read the time counted by the timer 5 and determine whether the counted time (period) has reached a reference time (period) and the level of power supply starting signal TSW is high. That is, this step S140 is to determine whether the microcomputer 3 has been started because the ignition switch 19 has been turned on or by power supply starting signal TSW from the timer 5. Alternatively, step S140 might be to read and determine the state of the ignition switch 19, or to determine whether the level of power supply starting signal TSW from the timer 5 to the driving circuit 17 is high, by directly reading this signal level.

If it is determined at step S140 that the level of power supply starting signal TSW is high, the microcomputer 3 is regarded as having been started by the timer 5, and not by the ignition switch 19. In this case, step S150 and the subsequent steps will be executed.

Step S150 is to block off a gas recovery system for recovering the evaporation gas from the fuel tank of the engine, and to pressurize the blocked system by means of an evaporation pump, in order to carry out a diagnosis of the evaporation purge system. The diagnosis is carried out to inspect the airtightness of the recovery system and, ultimately, the possibility of evaporation gas leaking, on the basis of the pressure change in this system at the time when the system is blocked off and then pressurized (or decompressed).

The next step S160, which is executed after the pressurization by the evaporation pump is started, is to write control data into the nonvolatile memory 9. After the microcomputer 3 stops operating when the ignition switch 19 is turned off, the volatile memory 42 holds the control data until the time counted by the timer 5 reaches the reference time. This makes it possible to maintain good accessibility for writing and reading the control data, and to greatly reduce the frequency at which control data is written into the nonvolatile memory 9. The processing for writing the data will be described later in detail.

The writing step S160 is followed by step S170 of detecting evaporation gas leakage on the basis of the pressure change in the gas recovery system at a time when the predetermined pressurization has been carried out. The next step S180 is to instruct the timer 5 to clear the power supply starting signal TSW so as to make the level of this signal low. The next step S190 is to determine whether the ignition switch 19 has been turned on. The determination may be based on starter signal STA.

If the ignition switch 19 is turned on while the microcomputer 3 is activated by the timer 5, step S190 is followed by step S220, where the microcomputer 3 executes engine control, speed change control for the automatic transmission and/or other control. The engine control may be ignition timing control and/or fuel injection quantity control. If it is determined at step S190 that the ignition switch 19 is still held off, this step is followed by step S200.

Step S200 is to determine whether a writing error has occurred, which prevents the control data from being written into the nonvolatile memory 9 at step S160. The writing error may be a writing condition error, which prevents the execution of the writing into the nonvolatile memory 9 because each of the writing conditions for writing control data into this memory is outside a predetermined range. The writing conditions may be the ambient temperature, the operating voltages, etc. Alternatively, the writing error may be a written data error, which occurs in the control data written into the nonvolatile memory 9.

If a writing error occurs, the control data stored in the volatile memory 42 needs to be held as it is. In this case, step S210 is skipped, where the microcomputer 3 outputs the low-level designation signal PII to reset the holding of the high-level signal in the holding circuit 51. If it is determined at step S200 that control data has been normally written, this step is followed by step S210 of outputting low-level designation signal PII so that the level of the signal output from the holding circuit 51 can be low. Alternatively, step S210 might be to make the level of the flag SRAMflg low. In this case, the state of the flag SRAMflg can be accurately determined at step S110.

The next step S290 is to output the low-level power supply holding signal PI so as to stop the supply of current from the driving circuit 17 to the main relay 21, thereby stopping the supply of operating voltage Vom from the power supply circuit 11. When low-level designation signal PII is output, the level of the signal from the main relay 21 is high, so that the switch 13 is not turned off. The switch 13 is turned off when the current supply to the main relay 21 is stopped at step S290.

When the switch 13 is turned off, the power supply circuit 7 is stopped from generating operating voltage Vos and outputting it to the volatile memory 42. Thus, when the reference time has passed after the microcomputer 3 stops operating when the ignition switch 19 is turned off, the power supply circuit 7 is stopped from generating operating voltage Vos and outputting it to the volatile memory 42. This makes it possible to reduce the dark currents in the power supply circuit 7 and volatile memory 42. The processing in this embodiment causes control data to be written into the nonvolatile memory 9 every time the supply of operating voltage Vos to the volatile memory 42 is stopped. This reliably prevents such a failure to write control data into a nonvolatile memory as may occur in the conventional art.

If the microcomputer 3 is started because the ignition switch 19 is turned on, step S140 is followed by step S220. Step S220 is to execute the engine control, the speed change control for the automatic transmission and/or other control on the basis of the sensor signals, the gear signal, and the control data stored in the volatile memory 42. The next step S230 is to determine whether the ignition switch 19 is still held on. If the ignition switch 19 is held ON, step S230 is followed by an alarm step S240, which is followed by the controlling step S220 stated above. This closed loop processing is repeated until the ignition switch 19 is turned off.

The alarm step S240 may be to light an indicator of the instrument panel so as to inform the driver etc. of a failure to write control data into the nonvolatile memory 9, if a writing error occurs in the foregoing writing step. Of course, if the writing step is normally executed, there is no alarm at step S240.

If it is determined at step S230 that the ignition switch 19 is OFF, this step is followed by step S250 of incrementing a counter ONCNT for counting the frequency at which this switch has been turned on and off. The next step S260 is to determine whether the counted frequency is at least 14. As will be stated later on, the counted frequency is cleared if control data is normally written into the nonvolatile memory 9. Accordingly, step S260 is to determine whether the ignition switch 19 has been turned on and off at least 14 times, without control data written into the nonvolatile memory 9.

The control data includes the learning values with which the engine and the automatic transmission can be controlled. Every time the vehicle is driven, the control data is updated on the basis of the sensor signals, the driving condition of the vehicle, etc. Consequently, if the vehicle is repeatedly driven, without control data written into the nonvolatile memory 9, only the control data stored in the volatile memory 42 is the latest, and old control data is stored in the nonvolatile memory 9. In such a situation, for example, if battery replacement has caused the control data in the volatile memory 42 to be lost, the engine control etc. need to be based on quite old control data when the next control is started. This may worsen the controllability.

Accordingly, if the determination at step S260 results in YES, this step is followed by step S270 of forcedly writing control data into the nonvolatile memory 9. This makes it possible to update the control data in the nonvolatile memory 9 even if the vehicle is repeatedly driven before the timer 5 counts the reference time.

The next step S280 is to activate the timer 5 and start it counting. The subsequent step S290 is to make the level of power supply holding signal PI low, so that the microcomputer 3 stops operating.

Figure 3:
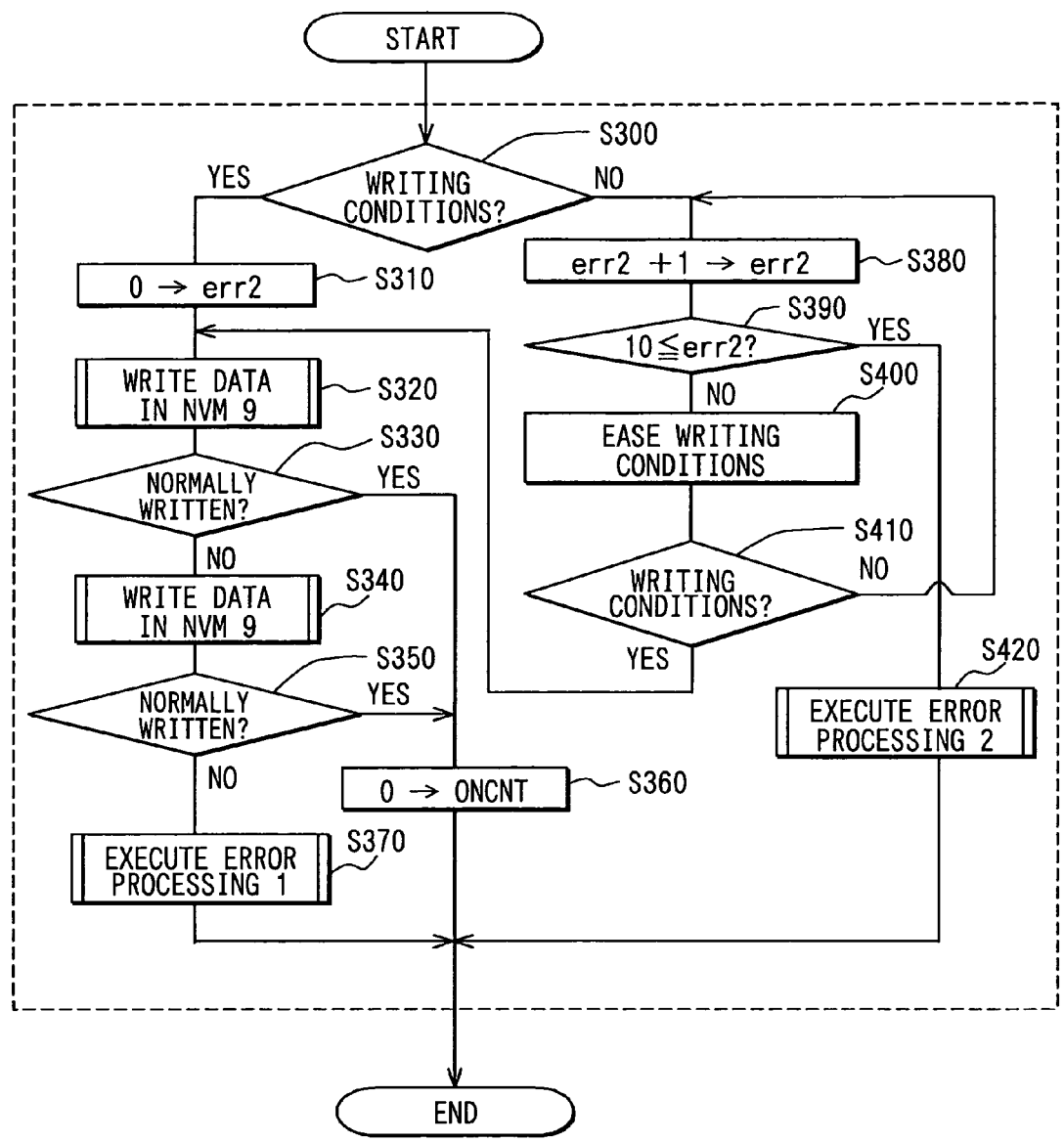
FIG. 3 is a flowchart of the processing for writing control data into a nonvolatile memory of the electronic control unit.

FIG. 3 is a flowchart of the processing for writing control data into the nonvolatile memory 9. The first step S300 of this processing is to determine whether the writing conditions for writing the control data into the nonvolatile memory 9 are met. The determination may involve determining whether the ambient temperature and operating voltage Vom (or operating voltage Vos or battery voltage VB) fall within the respective predetermined ranges. The ambient temperature suitable for the write processing may range between –20 and 80 degrees C. The operating voltage Vom suitable for the write processing is 4 or more volts. For the determination with battery voltage VB, the voltage may be compared with a range between 8 and 16 volts.

If it is determined at step S300 that the writing conditions are not met, this step is followed by step S380 of incrementing a counter err2 for counting the frequency (number of times) at which the conditions are not met. The next step S390 is to determine whether the counted frequency is at least 10. If the determination at step S390 results in NO (more than 10), this step is followed by step S400 of easing the writing conditions so that more control data can be written into the nonvolatile memory 9. Specifically, step S400 is to enlarge the temperature range and/or operating voltage (or battery voltage) range within which control data can be written.

The next step S410 is to determine whether the eased writing conditions are met. If it is determined at step S410 that the writing conditions are met, a step S320 and the subsequent steps are executed so that control data can be written into the nonvolatile memory 9. If the eased writing conditions are not met, the routine returns to step S380 of incrementing the counter err2.

Figure 2:
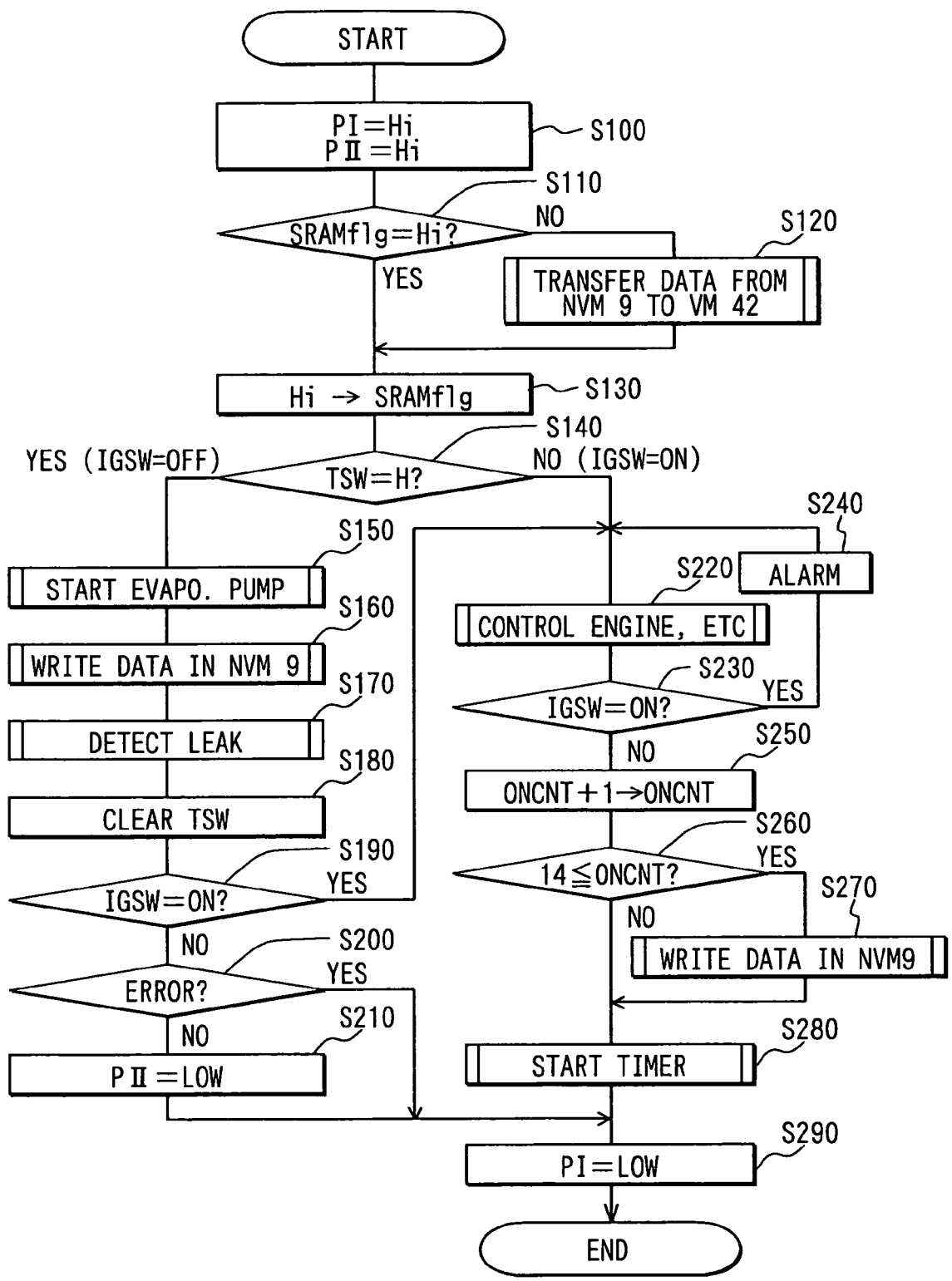
FIG. 2 is a flowchart of the processing executed by a microcomputer of the electronic control unit.

If the writing conditions are not met consecutively ten times even while they are eased, step S390 is followed by step S420 for error processing 2. The error processing. 2 is to set up an error flag, which represents a writing condition error, and store the flag in the volatile memory 42. The error flag indicates that no data was written into the nonvolatile memory 9 because the writing conditions were not met. At step S200 of FIG. 2, it is determined from the state of the error flag whether a writing error has occurred. After the error processing 2 is executed at step S420, the write processing ends.

By thus determining, the predetermined number of times (ten times), whether the writing conditions are met, it is possible to increase the probability that control data will be written into the nonvolatile memory 9. If the writing conditions are not met even once, however, the write processing is stopped. This prevents the microcomputer 3 from continuing meaningless operation, which results in increased power consumption.

If it is determined at step S300 that the writing conditions are met, this step is followed by step S310 of clearing the counter err2 to zero. The next step S320 is to write control data into the nonvolatile memory 9. This writing step is followed by step S330 of determining whether the control data has been normally or successfully written. The determination may include steps of reading the written data from the nonvolatile memory 9, comparing the read data and the control data stored in the volatile memory 42, and determining that the data has been correctly written into the nonvolatile memory 9 if the compared data are identical with each other.

If it is determined at step S330 that the control data has been correctly written into the nonvolatile memory 9, this step is followed by step S360 of clearing the counter ONCNT to zero. Then, the write processing ends. As described above, the counter ONCNT counts the frequency at which the ignition switch 19 has been turned on and off. If it is determined at step S330 that the control data has not been correctly written, this step is followed by step S340 of writing the data again into the nonvolatile memory 9.

The next step S350 is to determine whether the control data has been normally written. If it is determined at step S350 that the control data has been correctly written, this step is followed by the foregoing step S360. If it is determined again that the data has not been correctly written, step S350 is followed by step S370 for error processing 1.

The error processing 1 is to set up an error flag, which represents a written data error, and store the flag in the volatile memory 42. This error flag indicates that no control data can be correctly written into the nonvolatile memory 9. It is preferable that the error processing 1 be executed with reference to the frequency counted by the counter err2. It is possible to determine from the counted frequency whether the control data has been written after the writing conditions are eased. Therefore, the error processing 1 may include storing the counted frequency as well in the volatile memory 42 so that the stored frequency can be read out later when the evaporation purge system is diagnosed. After the error processing 1 is executed at step S370, the write processing ends as it is.

Thus, if it is determined that the control data has not been correctly written into the nonvolatile memory 9, the data is written again. However, if the writing results in failure the predetermined number of times (written data error), the writing is stopped. This prevents the microcomputer 3 from writing the data too many times with increased power consumption.

Figure 4:
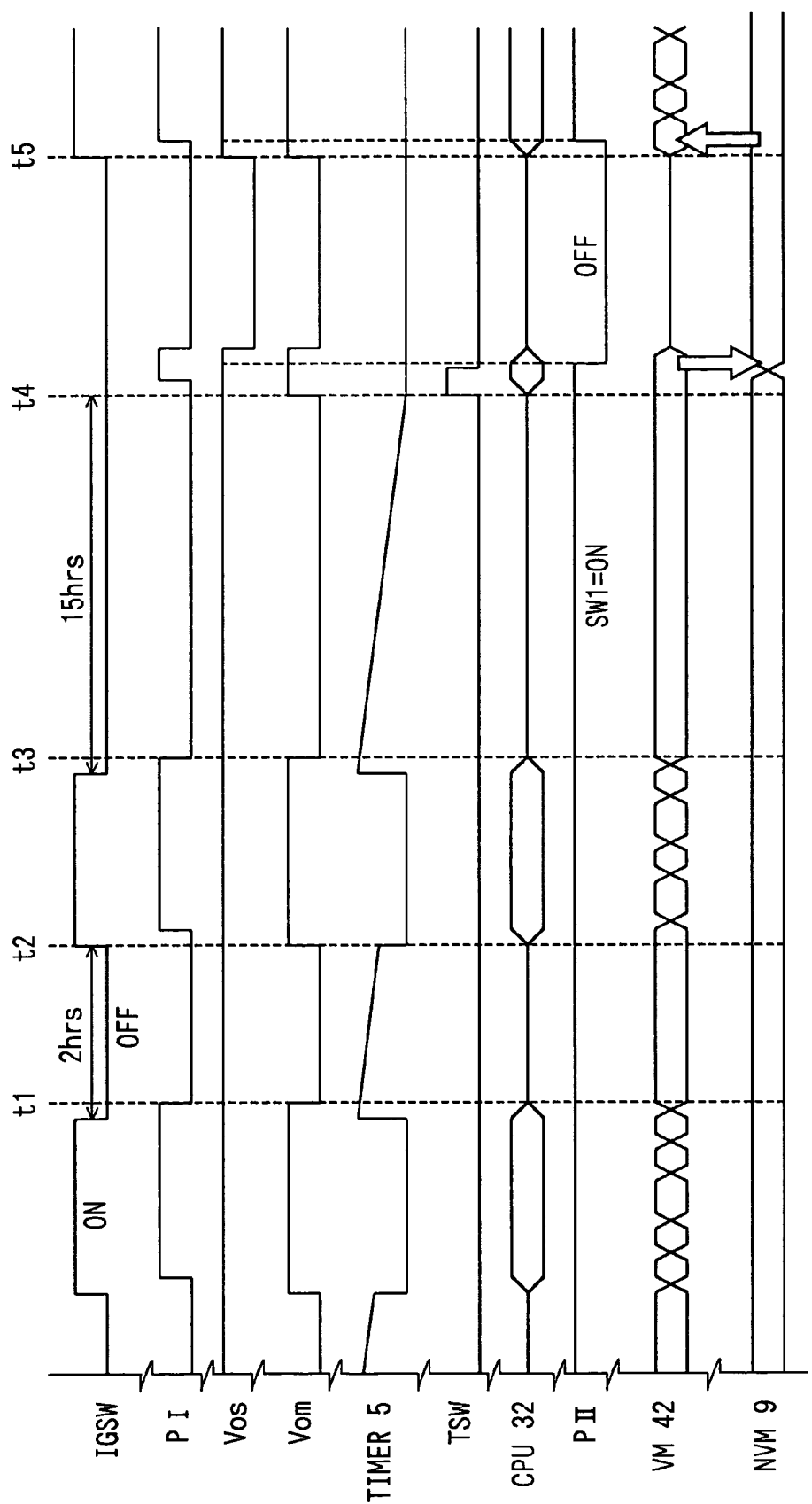
FIG. 4 is a time chart of the processing for writing control data into the nonvolatile memory.

FIG. 4 is a time chart showing the operation of control data writing into the nonvolatile memory 9 by means of the foregoing processing, which is executed by the microcomputer 3.

In the time chart shown in FIG. 4, if the ignition switch 19 is turned off for the first time, the level of power supply holding signal PI becomes low at time t1, because the power supply circuit 11 stops outputting the operating voltage Vom. In the meantime, when the ignition switch 19 is turned off, the timer 5 starts counting time. The ignition switch 19 is turned on at time t2, when the counted time has not reached the reference time. Accordingly, from time t1 to time t2, the control data is not written into the nonvolatile memory 9, but held by the volatile memory 42, which is supplied with the operating voltage Vos.

If the ignition switch 19 is turned off for the second. time, the level of power supply holding signal PI becomes low at time t3. If the period from time t3 to time t5, at which the ignition switch 19 is assumed to be turned on, is longer than the reference time, the timer 5 makes the level of power supply starting signal TSW high at time t4, when the time counted by the timer 5 reaches the reference time. When the level of power supply starting signal TSW becomes high, the power supply circuits 7 and 11 output the operating voltages Vom and Vos, activating the microcomputer 3 (CPU 32). The activated microcomputer 3 first makes the level of power supply holding signal PI high so as to maintain the operating voltage Vom until predetermined processing ends. The predetermined processing includes writing the control data into the nonvolatile memory 9.

If the control data stored in the volatile memory 42 has been written normally into the nonvolatile memory 9, the microcomputer 3 makes the level of power supply starting signal TSW low and outputs the designation signal PII to the holding circuit 51. The designation signal PII resets the high-level signal output from the holding circuit 51 and makes the signal level low. The microcomputer 3 also makes the level of power supply holding signal PI low, so that the power supply circuits 7 and 11 stop outputting operating voltages Vos and Vom. This stops the operation of the power supply circuits 7 and 11 and the supply of operating voltage Vos to the volatile memory 42 until time t5.

If the microcomputer 3 is activated because the ignition switch 19 is turned on at time t5, it first reads the control data from the nonvolatile memory 9 and stores the read data in the volatile memory 42, and subsequently executes the normal engine control and transmission control.

In the embodiment, control data is written into the nonvolatile memory 9 at the same time that the evaporation purge system is diagnosed. Alternatively, the write timing might differ from the diagnosis timing. For example, the microcomputer 3 could variably set the time counted by the timer 5. After the ignition switch 19 is turned off, a time of five hours, after which the evaporation purge system should be diagnosed, might be set in the timer 5. After the diagnosis is carried out after five hours, a time of ten hours might be set in the timer 5 to be counted by it. The control data might be written into the nonvolatile memory 9 after ten hours. Alternatively, two timers might be provided. The timing for writing the control data might be set in one of the timers. The timing for diagnosing the purge system might be set in the other timer.

In the embodiment, control data is written into the nonvolatile memory 9 during the pressurization by means of the evaporation pump. If the results of the evaporation gas leak detection as well should be stored in the nonvolatile memory 9, the control data and the detection results might be written into this memory after the detection. If it is not desirable that the diagnosis of the evaporation purge system might consume power of the battery 23, the control data might be written before the diagnosis. If the control data is thus written before the leak detection results are obtained, only the results might be written separately into the nonvolatile memory 9 when they are obtained.

In the embodiment, it is checked after the diagnosis of the evaporation purge system whether the ignition switch 19 has been turned on. Alternatively, when the ignition switch 19 is turned on, an interrupt might be generated to interrupt the diagnosis. In this case, in order that the control data stored previously and currently in the nonvolatile memory 9 may not be mixed, the interrupt processing for signal IGSW might need to be started after meaningful block unit writing ends.

In the embodiment, the switch 13 is connected between the power supply circuit 7 and battery 23. When the switch 13 is turned off, the power supply circuit 7 stops supplying operating voltage Vos, so that the dark currents in this supply circuit and the volatile memory 42 stop. Alternatively, the switch 13 might be connected between the power supply circuit 7 and volatile memory 42. In this case, because the power supply circuit 7 would keep outputting operating voltage Vos even if the switch 13 is turned off, the power supply circuit 7 could be used in common as the five-volt power supply for the antitheft device or another device that needs to constantly operate. This connection would also be effective if the timer 5 needs to keep counting even after the lapse of the reference time, which may be 15 hours.

The present invention is not limited to the embodiment and its modifications, but may be modified in various forms without departing from the spirit of the invention.

What is claimed is:

1. An electronic control unit for a vehicle having equipment, the control unit comprising:
    a microcomputer for controlling the equipment;
    a first power supply circuit that starts supplying the microcomputer with operating power when a predetermined switch signal is applied from an outside, and stops supply of the operating power when the predetermined switch signal disappears;
    a timer for counting time after the switch signal disappears, and for starting up the first power supply circuit when the counted time reaches a predetermined time;
    a volatile memory for storing control data to be used for controlling the equipment;
    a second power supply circuit for supplying the timer and the volatile memory with operating power even after the switch signal disappears; and
    a nonvolatile memory for storing the control data stored in the volatile memory,
    wherein, when the counted time reaches the predetermined time, the microcomputer starts operating with the operating power supplied from the first power supply circuit, writes the control data stored in the volatile memory into the nonvolatile memory, stores the written data in the nonvolatile memory, and thereafter stops the power supply from the second power supply circuit to the volatile memory.

2. The electronic control unit according to claim 1, wherein:
    the volatile memory has a flag indicating whether the power supply from the second power supply circuit to the volatile memory has stopped; and
    the microcomputer reads the control data from the nonvolatile memory and stores the read data in the volatile memory if the microcomputer determines on the basis of the state of the flag that the power supply to the volatile memory has stopped, when the microcomputer starts operating with the operating power supplied from the first power supply circuit.

3. The electronic control unit according to claim 1, wherein the microcomputer determines from the counted time or a power supply starting signal whether the microcomputer has started operating because the switch signal has been applied or because the counted time has reached the predetermined time, when the microcomputer has started operating with the operating power supplied from the first power supply circuit.

4. The electronic control unit according to claim 1, wherein the microcomputer determines whether a predetermined writing condition is met in terms of at least temperature and operating voltage and writes the control data into the nonvolatile memory if the writing condition is met, before the microcomputer writes the control data into the nonvolatile memory.

5. The electronic control unit according to claim 4, wherein:
    the microcomputer determines, a predetermined number of times, whether the writing condition is met, if the writing condition is not met; and
    the microcomputer stops writing the control data into the nonvolatile memory as an occurrence of a writing condition error, if the writing condition is not met even once.

6. The electronic control unit according to claim 5, wherein the microcomputer eases the writing condition, when the microcomputer determines the predetermined number of times whether the writing condition is met.

7. The electronic control unit according to claim 5, wherein the microcomputer issues an alarm about the writing condition error when the switch signal is applied, if the writing condition error occurs.

8. The electronic control unit according to claim 1, wherein:
    the microcomputer determines whether the control data stored in the volatile memory has been written correctly into the nonvolatile memory; and
    the microcomputer maintains the power supply from the second power supply circuit to the volatile memory, if the microcomputer determines that the control data has not been written correctly into the nonvolatile memory.

9. The electronic control unit according to claim 8, wherein:
    the microcomputer writes the control data a plurality of times into the nonvolatile memory, if the microcomputer determines that the control data has not been written correctly into the nonvolatile memory; and
    the microcomputer stops writing the control data into the nonvolatile memory as an occurrence of a written data error, if the control data cannot be written successfully even once into the nonvolatile memory.

10. The electronic control unit according to claim 9, wherein the microcomputer issues an alarm about the written data error when the switch signal is applied, if the written data error occurs.

11. The electronic control unit according to claim 1, wherein:
    the microcomputer counts the frequency at which the switch signal is applied; and
    the microcomputer writes the control data into the nonvolatile memory, if the control data has not been written even once into the nonvolatile memory after the microcomputer starts counting the frequency and until the counted frequency reaches a predetermined value.

\* \* \* \* \*